United States Patent [19]

Simmons

[11] 3,839,647

[45] Oct. 1, 1974

[54] TRANSISTOR LINEARIZER CIRCUIT

[75] Inventor: David Harry Simmons, Palo Alto, Calif.

[73] Assignee: Litton Systems, Inc., San Carlos, Calif.

[22] Filed: Nov. 8, 1973

[21] Appl. No.: 413,959

[52] U.S. Cl. ................. 307/229, 307/254, 307/296, 307/310

[51] Int. Cl. .......................................... H03k 17/00

[58] Field of Search ........... 307/229, 254, 230, 310, 307/296; 235/197, 150.53; 328/142

[56] References Cited

UNITED STATES PATENTS

| | | | |
|---|---|---|---|
| 3,622,770 | 11/1971 | Edelson | 307/229 |
| 3,686,478 | 8/1972 | Goldberg et al. | 307/229 X |

*Primary Examiner*—Rudolph V. Rolinec
*Assistant Examiner*—B. P. Davis
*Attorney, Agent, or Firm*—Ronald M. Goldman

[57] ABSTRACT

The disclosed invention includes a transistor having a predetermined β characteristic, a first resistance means coupled between a first voltage source and the collector and a second resistance means connected between a second voltage source and the emitter and an operational amplifier having its input connected to the emitter and an output connected to the base of the transistor wherein a constant voltage is automatically maintained at the emitter. By varying the magnitude of one of the voltage sources, such as the first voltage source, while maintaining the other essentially constant the output voltage obtained at the collector remains at a constant level over a predetermined range of magnitudes of the input voltage source up to an input voltage denoted the "breakpoint voltage," and for greater magnitudes of input voltage provides an output voltage which is directly proportional to the amount by which the input voltage exceeds such breakpoint voltage. And in a novel function generator circuit which employs a plurality of such nonlinear elements adjusted to different breakpoint voltage levels the operational amplifier output is connected in parallel to each of the base electrodes of the plurality of transistors and the output of each transistor is taken from the collector and summed together in a suitable summing network to provide the function generator output voltage. In another aspect of the function generator, a linear resistor network which forms a voltage divider is coupled to the source of variable voltage to provide an output that is directly proportional to the magnitude of the input source over the entire range; this output is summed together with the output of the nonlinear circuits to provide a more general output characteristic.

19 Claims, 5 Drawing Figures

TRANSISTOR LINEARIZER CIRCUIT

FIELD OF THE INVENTION

My invention relates to a nonlinear electronic circuit, more particularly, to a circuit which produces an output that bears a nonlinear relationship to a voltage applied to an input.

My invention further relates to a voltage function generator in which a plurality of the aforesaid nonlinear circuits are connected together so as to produce an output characteristic that is an arbitrary function of an input voltage.

BACKGROUND OF THE INVENTION

In many electrical circuit applications there is a need to provide a voltage which bears a predetermined functional relationship to the magnitude of an input voltage. By way of example, voltage tuned microwave oscillators are available that provide a source of microwave energy of a frequency determined by the level of voltage applied to the oscillator tuning element, such as a varactor. By varying the voltage level applied to the varactor, the effective capacitance of the varactor is varied and the frequency of the signals from the oscillator is likewise varied. Typically the relationship between the output frequency of the oscillator and the input voltage applied to the varactor is nonlinear. Because of this nonlinearity the usefulness of the oscillator is limited. One method heretofore used to correct that relationship is to employ in circuit an electrical function generator, sometimes known as a "linearizer." The linearizer may be electrically coupled in series circuit between the source of varactor tuning voltage and the input to the varactor of the oscillator. The linearizer receives the input voltage from the tuning source and provides an output voltage which is a predetermined function thereof. By design the output voltage of the linearizer introduces sufficient nonlinearity in the relationship to compensate or "linearize" the nonlinear characteristics of the microwave oscillator. Hence in the overall oscillator system as compensated the output frequency of the microwave oscillator bears a linear relationship with the input voltage. Thus, for example, in swept frequency applications the output frequency bears a true relationship to the level of input voltage and in that event the source tuning voltage is used as a true monitor or indicator of the oscillator output frequency.

A function generator is similarly useful in other applications. Thus a function generator can be used to modify input voltages as a function of temperature and thereby provide temperature compensation in an electrical circuit; with analog computers, an input voltage can be "transformed" pursuant to a specified mathematical relationship into a different voltage. Accordingly the linearizer or, more generally speaking, the function generator is of wide application in the electronic industry.

The mechanics through which a desired output characteristic is obtained is relatively simple: by combining a plurality of individual nonlinear electrical circuits or components, each of which contributes to the total output voltage. The input voltage is applied to all of the nonlinear circuits in parallel and only at various discrete levels of voltage is one or the other or more of the individual nonlinear circuits activated to generate a voltage and the individual output voltages are "summed" or added together either additively or a combination of additively and subtractively by a summing amplifier to produce a given output voltage.

As is brought out in U.S. Pat. Nos. 3,622,770, 3,636,321, 3,686,478, 3,059,853, 2,831,107, and other prior art patents and publications, any desired output voltage characteristic may be duplicated by the summation of straight lines having various slopes. Thus with knowledge of the type of functional relationship desired between the input and output voltages, the engineer has heretofore in this way simulated such an output voltage.

The nonlinear devices employed heretofore for this purpose included diodes, Zener diodes, or transistor switches, such as is brought out in the exemplary U.S. Pat. Nos. 3,636,321, 3,388,344, 2,831,107, 2,923,876, 3,622,770 and 2,697,201. In practice, function generators using diodes are intrinsically sensitive to ambient temperature changes and accurate temperature compensation is not usually possible. On the other hand, systems using Zener diodes can be made relatively insensitive to ambient temperature changes, but they are unsuitable for operation at high "slew" rates. Moreover these systems offer a limited choice of "breakpoint" voltages and this limitation handicaps the designer who is attempting to provide proper and exact correction of system nonlinearities. Then too, in an actual amplifier the process of setting up the output function can become impossibly tedious if the adjustment of one of the plurality of the circuits affects the setting of the others. In the past, considerable circuit complexity is usually necessary to reduce the interaction between individual circuits to a tolerable level so as to somewhat limit the time necessary to make the adjustment. Still other systems employ transistors, more particularly, transistor switches which function in the nature of diodes in that they turn on fully or turn off fully at some predetermined voltage level.

OBJECTS OF THE INVENTION

Accordingly it is an object of my invention to provide a new and improved nonlinear circuit element.

It is a further object of my invention to provide a novel voltage function generator.

It is a still further object of my invention to provide a linearizer circuit which is capable of operation at high slew rates and which is relatively insensitive to ambient temperature.

It is a still further object of my invention to provide a generator of arbitrary functions made up of a plurality of individual nonlinear circuits that permit individual adjustment without substantial interaction therebetween.

BRIEF SUMMARY OF THE INVENTION

In my invention I employ as a nonlinear element a transistor in combination with a means to maintain the emitter voltage constant so that the transistor is always conducting current through at least one electrode and the breakpoint voltage level is obtained through current saturation of the collector electrode circuit.

In accordance with the invention, the circuit includes a transistor having a predetermined current transfer characteristic, $\beta$; a first resistor connected in series between the transistor collector and a first source of voltage; a second resistor connected in series between the transistor emitter and a second source of voltage; a control means, suitably a conventional operational amplifier, which has an input connected to the emitter and an output connected to the transistor base and responsive to any change in emitter voltage for supplying current at its output to the transistor base sufficient in amount to maintain the emitter voltage at approximately zero volts. Thus as one or the other of said voltage sources is increased in magnitude as an "input voltage," such as the first voltage source, and the remaining voltage source remains at a constant magnitude, the output voltage monitored at the transistor collector remains at a level of approximately zero volts through a predetermined range of input voltages up to an input voltage, denoted the "breakpoint voltage," and thereupon the output voltage at the collector increases linearly as a function, a "straight line" function of the further increase in magnitude of the input voltage beyond the breakpoint voltage. Suitably the breakpoint voltage can be varied by changing the values of the first or second resistor, the magnitude of the second voltage source or by the selection of a transistor with a different $\beta$.

In a complete function generator employing the novel nonlinear circuit element, a plurality of the foregoing circuits are provided and are adjusted to different breakpoint voltage levels and each circuit is connected to the input voltage source. A single operational amplifier has its input connected to the emitter of one of the transistors and its output is coupled in parallel to the base of each of the plurality of transistors. And the collector of each of the transistors is connected to a suitable voltage summing circuit which adds together the output voltage at each collector in a predetermined manner to provide a function generator output. Further an additional voltage that is directly proportional to the input voltage over the entire range of input voltage may be "added" to this output.

With this I have found improved temperature stability due to dependence upon the saturated collector emitter voltage which is the one transistor parameter most insensitive to temperature, and I obtained high slew rates, perhaps two to three times as great as those attained with diode circuits and perhaps two orders of magnitude better than Zener diode circuits.

The foregoing and other objects and advantages of my invention together with the structure characteristic of my invention as well as modifications thereto are better understood by giving consideration to the detailed description of the preferred embodiments thereof which follows taken together with the figures of the drawings.

DETAILED DESCRIPTION OF THE INVENTION

Figure 1:
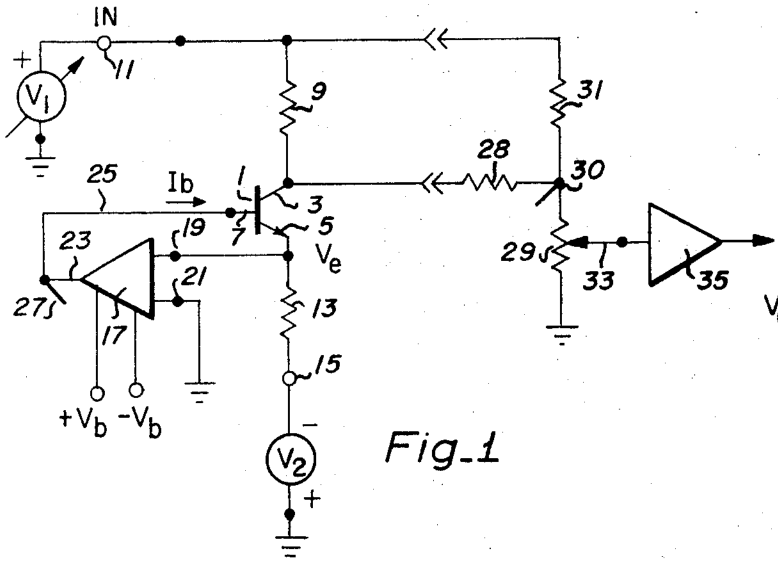
FIG. 1 illustrates a preferred embodiment of a nonlinear element embodying my invention.

The preferred embodiment of the novel nonlinear element in FIG. 1 includes a conventional "NPN" type transistor 1 which has a collector electrode 3, an emitter electrode 5 and a base electrode 7. A resistor 9 is connected electrically in series circuit between collector 3 and an input terminal 11. A resistor 13 is connected electrically in series circuit between emitter 5 and the voltage source input terminal 15. A conventional operational amplifier 17, symbolically illustrated, is included. Amplifier 17 has a first input 19 and a second input 21 and an output 23. The operational amplifier is a well known electronic amplifying device that has a high impedance characteristic at its input terminals and a low impedance characteristic at its output and provides very high amplification or gain, as variously termed, between the input and output.

Amplifier input 19 is electrically connected to emitter 5 and input 21 is connected to electrical common (ground) potential for permitting the amplifier to make a voltage comparison between the emitter voltage and electrical ground potential (zero volts). Output 23 of operational amplifier 17 is connected via lead 25 to base 7 of transistor 1. With this connection the operational amplifier can provide necessary and sufficient current to transistor base 7 necessary to cause emitter 5 to be maintained at an essentially constant voltage of approximately zero volts.

Partial lead 27 is included in this figure to indicate that the output of this operational amplifier may be connected in multiple with the base electrodes of other transistors of similar nonlinear elements as becomes apparent from a subsequent description of one type of voltage function generator known as a "linearizer" which incorporates a series of those novel nonlinear elements. The output of transistor 1 appears at collector 3. A large value resistor 28 is connected between the collector and a summing resistor or potentiometer 29, a resistor having a relatively low resistance.

For versatility a supplemental circuit between input terminal 11 and the end of summing resistor 29 is provided via another large value resistor 31. The remaining end of resistor 29 is connected to electrical ground potential. Potentiometer type resistor 29 has a positionable output tap 33 through which a voltage is coupled to other electrical apparatus, such as operational amplifier 35, symbolically illustrated. Obviously other electrical output coupling means can be substituted for the particular coupling arrangement of resistor 28 and potentiometer 29 illustrated for coupling the voltage or a true representation of the voltage at collector 3, as hereinafter becomes more apparent.

In operation a suitable source of DC bias voltage, negative polarity, is applied to terminal 15 and suitable sources of positive and negative polarity bias voltages are applied to the terminals $+V_b$ and $-V_b$ of the operational amplifier.

Circuit input 11 is connected to a source of input voltage, $V_1$, which is the voltage that is to be functionally "converted".

With zero volts applied at input 11, collector 3 is at zero volts potential. The operational amplifier 17 is coupled to transistor 1 and forms a means to maintain the emitter electrode 5 at an essentially constant voltage of approximately zero volts or electrical ground potential, as variously termed.

The operational amplifier is a unique device which has a high impedance input characteristic and a low impedance output characteristic. As a result, the amplifier senses the voltage at its input and draws negligible input current. On the other hand, it provides very large output current at various output voltages. Internally the operational amplifier compares the voltage at its two inputs and when connected in a type of feedback circuit, as in the present invention, the amplifier provides necessary output current to reduce the voltage difference between its two inputs to zero volts. In the embodiment of FIG. 1, one of the inputs, 21, is connected to electrical ground, hence zero volts, while the other input, 19, is the source of an input voltage that may vary in magnitude and which, as hereinafter described, is desirably maintained at zero volts potential. The output 23 is connected to base 7 of transistor 1 which in turn is functionally connected to the emitter 5 circuit and which in turn is connected in circuit to amplifier input 19 to thus provide a type of feedback circuit between the amplifier input and output. Thus, should the input voltage tend to increase the amplifier output reduces the base current until the input voltage is back at zero volts in an essentially regulating circuit.

If the voltage of emitter 5 sensed at input 19 of operational amplifier 17 departs from a zero, i.e., becomes positive, which the amplifier detects by comparison of this input with input 21 connected to ground potential, the amplifier provides an output current, $I_b$, via 23 and lead 25 into the base electrode 7 sufficient in amount to cause emitter current to decrease. Since the voltage at emitter 5, $V_e$, is the net voltage of the bias source applied to terminal 15, such as $-V_{dc}$ and the voltage drop across resistor 13, the product of the emitter current, $I_e$ and the resistance $R_{13}$, $(I_e \cdot R_{13})$, is equal to the voltage at emitter 5 less the voltage $-V_{dc}$, or mathematically $V_e = -V_{dc}+I_eR_{13} \approx 0$, proper change in the base current changes the emitter current in a manner to maintain the emitter at an essentially constant voltage of approximately zero volts.

In speaking of approximate voltage it is noted that the bias voltages and input voltages applied to the circuit are on the order of volts whereas the voltage differences referred to as approximate are on the order of millivolts or one-thousandths of a volt, several orders of magnitude in difference.

The electrical characteristics of the transistor are adequately described in the prior art technical literature. For purposes of this description the primary characteristics of concern is saturation, a condition of transistor operation where the collector to emitter voltage is too low for the base voltage or current to exert any significant control over the collector current and the current transfer characteristic, $\beta$. In saturation or out of saturation the relationship between the currents is such that $I_e=I_b+I_c$. When the transistor is out of saturation the additional relationships $I_b=I_c/\beta$ and $I_e=I_c(1+1/\beta)$ apply. The factor $\beta$ is known as the current transfer characteristic of a transistor, sometimes designated $h_{fe}$, and is a simple number. As becomes apparent hereinafter the transistor is operated in saturation and then goes out of saturation when the input voltage $V_1$ exceeds a certain "breakpoint voltage level."

Figure 2:
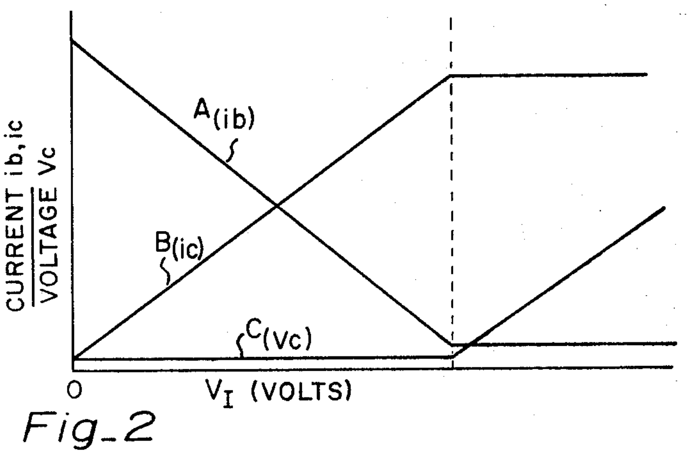
FIG. 2 illustrates the relationship between different currents in the transistor element of the embodiment of FIG. 1 as a function of input voltage.

When the voltage $V_1$ is zero the current to the base $I_b$ is at a maximum as illustrated in Curve A of FIG. 2. As the level of voltage applied at input 11 increases above zero volts, a corresponding collector current, $I_c$, flows through resistor 9 and collector 3 into the transistor and out emitter 5, since the transistor is biased into conduction and is fully conducting. And the entire input voltage $V_1$ is essentially lost as a voltage drop across resistor 9. As a result the voltage at collector 3 remains at a voltage level of approximately zero volts. As the level of the input voltage $V_1$ increases further, the collector current $I_c$ increases further, as illustrated in Curve B of FIG. 2, but the collector 3, voltage, $V_c$, as illustrated in Curve C of FIG. 2, remains at essentially zero volts. It can also be seen from Curve A of FIG. 2 that the base current $I_b$ similarly decreases in level. This operation holds true for all levels of input voltages up to a predetermined input voltage, referred to as the "breakpoint level," at which condition the transistor is "out of saturation."

For any input voltage at 11 up to the breakpoint level, the voltage output at the collector 3 is approximately constant and is at essentially zero volts. The breakpoint level is determined by the condition under which the transistor 1 is not capable of conducting any additional current through its collector electrode 3, the collector current $I_c$ is thereafter constant essentially despite further increases in the magnitude of the input voltage $V_1$, the circuit consisting of resistor 9, collector electrode 3, emitter 5, resistor 13 to bias source 15 is said to be "out of saturation." Thus as the voltage input of $V_1$ is raised further in level, no additional current can pass through collector 3 and accordingly the collector current holds essentially constant at the out of saturation level. As a result the input voltage is not wholly dropped across resistor 9 and the voltage which appears at collector 3 begins to increase. This increase in voltage is essentially a linear function of the amount by which the input voltage $V_1$ exceeds the breakpoint voltage, $V_{bp}$.

Thus:

1.

$$V_1 = I_cR_9+I_{28}R_9+V_c$$

However since $I_{28}$ is the circuit output current to the summing circuit it is small in comparison to $I_c$ of the transistor and changes in $I_{28}$ are relatively small. For a change of input voltage above the breakpoint voltage $V_{bp}$ then

2

$$V_{1a} - V_{1b} = I_cR_9-I_cR_9+I_{28a}R_9-I_{28b}R_9+V_c$$

3

$$\Delta V_1 = O+\Delta I_{28}R_9+\Delta V_c$$

since $\Delta I_{28}$ very small $\approx$ O and $I_c$ is constant

4

$$\Delta V_1 \approx \Delta V_c$$

so that a one volt change in the input results in a one volt change of the collector voltage $V_c$.

The breakpoint voltage $V_{bp}$ is easily determined from the given circuit constants. Thus since at the condition where the transistor goes out of saturation

5

$$I_e = I_c\,(1+1/\beta)$$

6

$V_{bp} = I_cR_9$ since the collector voltage is still at zero and

7

$$I_e = V_2/R_{13}$$

substituting

8

$$V_2/R_{13} = I_c(1+1/\beta) = V_{bp}/R_9\,(1+1/\beta)$$

(9)

$$V_{bp}=\frac{R_9}{R_{13}}\,V_2\left(\frac{1}{1+\frac{1}{\beta}}\right)$$

10

$$V_{bp} = R_9/R_{13}\,(V_2)\,(\beta)/1+\beta$$

The breakpoint voltage of any nonlinear circuit is easily adjusted through change of values of resistor $R_9$ or $R_{12}$, voltage $V_2$, or the selection of a transistor with a different $\beta$.

In one specific example a type 2N5179 transistor was employed having a $\beta$ of approximately 50, $R_9$ was 4.53 thousand ohms, $R_{13}$ was 12.4 thousand ohms, $V_2$ was 12 volts, and operational amplifier was a type $\mu$A741 manufactured by Fairchild. The breakpoint voltage of the circuit was 4.30 volts and $V_1$ was varied over the voltage range of zero to 20 volts.

The circuit thus provides overall an output voltage level which is a nonlinear function of the input voltage applied at input 11.

The resistive by-pass circuit which includes resistor 31 provides an output voltage at tap 33 of potentiometer 29 which is a linear function of the voltage applied at input 11. The output of that circuit is combined in the summing potentiometer 29 with the output of the nonlinear element by means of resistor 28.

Figure 3:
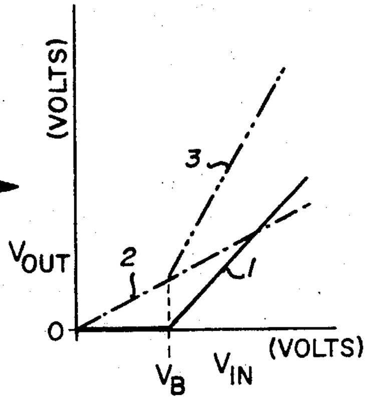
FIG. 3 illustrates the relationship between input and output voltages in the embodiment of FIG. 1.

Reference is made to the graphical illustration in FIG. 3. The nonlinear characteristic of the nonlinear element is illustrated by Curve 1. As is apparent the output appearing in the ordinate of the graph is drawn as a function of the input voltage as abscissa. The output voltage remains constant at approximately zero volts for all input voltages up to the breakpoint voltage $V_{bp}$, and thereafter increases linearly as a linear function of the amount the input voltage exceeds the breakpoint voltage, i.e., $V_{in}-V_{bp}$. Curve 2 illustrates the linear relationship between the input voltage at 11 and the output at junction 30 and Curve 3 illustrates the outputs when the output of the nonlinear element and the linear element are summed. Thus as is illustrated in Curve 3 the output voltage applied to the input of amplifier 35 increases as a predetermined linear function of the input voltage up to the breakpoint level. Thereupon the slope of the curve is increased. Mathematically the output voltage may be designed as $V_{out}$=K×$V_{in}$ for all $V_{in}$ less than $V_{bp}$, and $V_{out}$=M×$V_{in}$ for all voltages above the breakpoint voltage where K and M are constants and the constant M is greater than the constant K. The slope of the output 1 from the nonlinear element depends, of course, on the particular value of resistor 28.

Figure 4:
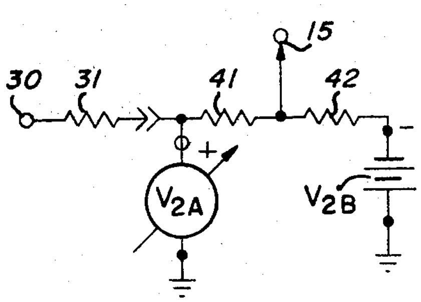
FIG. 4 illustrates certain modifications to the embodiment of FIG. 1 necessary to construct a second embodiment.

In the embodiment of FIG. 1 the source of input voltage $V_2$ applied to input 15 was held at a constant magnitude, suitably 12 volts in the specific example, whereas the source of voltage $V_1$ applied to terminal 11 in the collector served as a source of voltage of varying magnitude and in this sense is the input voltage to the nonlinear circuit. By a simple modification a variable input voltage can be connected instead to the emitter circuit of the transistor 1 as is partially illustrated in FIG. 4 which the voltage source connected to the collector circuit is of a constant magnitude. In an embodiment modified according to FIG. 4 the circuit is essentially the same as that in FIG. 1 except that the voltage supplies are changed and resistor 31 of FIG. 1 which is in the voltage dividing circuit to be connected to the source of input voltage is disconnected from the circuit of resistor 9 and is instead connected to the new source of variable input voltage. The source of voltage $V_1$ connected to terminal 11 of FIG. 1 is maintained at a constant magnitude, suitably 12 volts in the specific example, and this may be provided by a battery. The voltage source $V_2$ which is to be connected to input terminal 15 as shown in FIG. 4, is now made up of two voltage sources including a first source $V_{2b}$, represented by a battery and which in the specific example is a constant voltage of approximately 12 volts. Battery $V_{2b}$ is connected with its negative polarity terminal in series with resistor 42 to terminal 15 and with its positive polarity terminal at ground potential. A source of variable voltage $V_{2a}$ is connected with its positive polarity terminal in series with a resistor 41 to input terminal 15 and with its negative polarity terminal connected to electrical ground. Suitably source $V_{2a}$ is the input voltage to be converted and may be varied between zero and $R_{41}/R_{42}\cdot V_{2b}$ volts in the specific example.

The end of resistor 31 is connected in circuit with this input voltage.

As is apparent from FIG. 4, the two voltage sources $V_{2a}$ and $V_{2b}$ are connected in a voltage summing circuit so that the voltages presented to terminal 15, and hence $I_e$, varies as the voltage of source $V_{2a}$ is varied. $I_e$ will vary between $$\frac{V_{2b}}{R_{42}+R_{13}+R_{13}\frac{R_{42}}{R_{41}}}$$

when source $V_{2a}$ is at zero down to zero when source $V_{2a}$ is at $R_{41}/R_{42}\cdot V_{2b}$. In this embodiment, nonlinear operation is achieved by varying the emitter current of transistor 1, with the input voltage $V_1$ held constant, instead of by varying $V_1$, with the emitter current of transistor 1 held constant, as in the embodiment of FIG. 1.

Thus with source $V_{2a}$ functioning as the source of variable input voltage in the circuit of FIG. 4, the breakpoint voltage $V_{bp}$ of this embodiment is determined in accordance with the following circuit parameters:

11

$$V_{bp}\approx[(R_{41}/R_{42})\cdot V_{2b}] - [(V_1/R_9)\,(1+[1/\beta])\cdot [R_{13}+R_{41}(1+[R_{13}/R_{42}])]]$$

Figure 5:
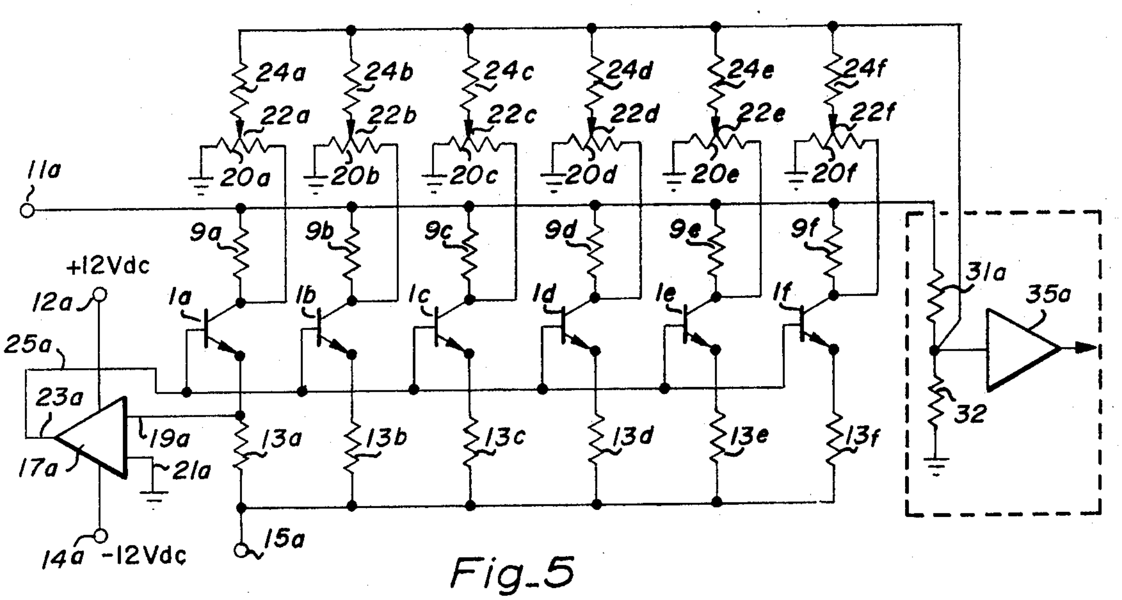
FIG. 5 illustrates a novel linearizer that embodies a plurality of the novel nonlinear circuit elements illustrated in FIG. 1.

The nonlinear element of FIG. 1 is included in a novel function generator presented in FIG. 5. For convenience, the elements of each nonlinear element in the function generator of FIG. 5 are labeled with the same numerical designation as the corresponding element in FIG. 1 and with an additional alphabetical designation. My preferred embodiment of a function generator includes: A transistor $1_a$, suitably of the NPN type, which has emitter, collector, and base electrodes; a voltage input terminal $11_a$; a bias voltage input terminal 15*a*; a resistor 13*a*, which is connected electrically in series between the bias voltage input terminal and the emitter electrode; an operational amplifier $17_a$ having an input $21_a$, connected to electrical ground potential, and another input $19_a$, connected to the emitter electrode of transistor $1_a$; bias input terminals $12_a$ and $14_a$ for connecting suitable bias voltage sources of positive and negative polarity, respectively, and an output $23_a$ which is connected to the base electrode of transistor $1_a$. Similarly, additional transistors $1_b$, $1_c$, $1_d$, $1_e$ and $1_f$ are included, each of which has a resistor $13_b$, $13_c$, $13_d$, $13_e$ and $13_f$, respectively, connected between a respective emitter electrode and input terminal 15 and each of which includes a second resistor $9_b$, $9_c$, $9_d$, $9_e$ and $9_f$, respectively, connected electrically in series circuit between input terminal $11_a$ and the respective collector electrode of the respective transistor and all of the base electrodes of each of the transistors $1_b$ through $1_f$ are connected electrically to the output $23_a$ of operational amplifier $17_a$. In effect, each of the individual nonlinear circuit elements are placed in parallel or in multiple, as variously termed, to the input voltage. The output of each of the nonlinear circuit elements incorporated in the illustrated function generator and which appears at the respective transistor collector electrode is taken and coupled to additional electrical amplifying apparatus such as an operational amplifier $35_a$ by means of a resistive voltage divider circuit of a slightly different construction than employed in the embodiment of FIG. 1. Thus a potentiometer resistor 20 having an output tap 22 is connected between the collector electrode of transistor $1_a$ and electrical ground potential. The tap 22 is connected to a resistor 24 and the other end of the resistor is connected to the input of amplifier $35_a$ and to one end of a low resistance value summing resistor 32. The other end of resistor 32 is connected to ground. Similarly each of the additional nonlinear elements, including those containing transistors $1_b$, $1_c$, $1_d$, $1_e$ and $1_f$, include potentiometer resistors $20_b$, $20_c$, $20_d$, $20_e$ and $20_f$, respectively, each of which is connected between electrical ground potential and the emitter electrode of the respective transistor and each of which includes an adjustable positionable tap $22_b$, $22_c$, $22_d$, $22_e$ and $22_f$, respectively, and a resistor $24_b$, $24_c$, $24_d$, $224_e$ and $24_f$, respectively, connected between the respective tap of the adjustable potentiometer and the input of amplifier $35_a$. Additionally a resistor $31_a$ is connected to the input of amplifier $35_a$ and to one end of resistor 32 and to input terminal $11_a$.

As is apparent to the reader, the number of nonlinear circuit elements that are included in the function generator of FIG. 5, namely six, depends on choice and, accordingly, upon accuracy of the ultimate output voltage and it is entirely within the purview of one skilled in the art to employ either fewer nonlinear circuit elements or a larger number of nonlinear circuit elements than the six elements illustrated.

It is noted that only a single operational amplifier need be employed regardless of the number of separate nonlinear element circuits placed in multiple, and that only the voltage level of the emitter electrode of one of the included transistors is monitored by the operational amplifier in order to fulfill the intended function. If it is desired however a separate operational amplifier can be associated with each nonlinear circuit element with its input and output connected only to the respective emitter and base of the transistor in such nonlinear circuit element.

As explained previously in connection with the description of the basic embodiment of FIG. 1, the output of the individual nonlinear elements is adjusted. That is, the breakpoint level can be adjusted by simply varying the bias voltage applied to the series emitter resistor, selecting the transistor or by selecting the resistance of the collector series resistor. For convenience, as illustrated in FIG. 5, the emitter bias voltage selected is applied to the emitter circuits of all the transistors since it is preferred for convenience. Alternatively, it is quite possible to adjust the breakpoint level of each transistor circuit to different values by selecting separate sources of bias voltages which differ from one another. For purposes of illustration, each of the resistors $9_a$ through $9_f$ is of a different value and hence the breakpoint voltage of each of the six circuits will be different. The voltage output which does appear on the individual collector electrodes subsequent to the input voltage exceeding the predetermined breakpoint thereof is applied across the potentiometer resistor $20_a$ through $20_f$, respectively. By suitable adjustment of the resistive tap $22_a$ through $22_f$, a portion of the output voltage is applied through the high resistance resistor $24_a$ through $24_f$, respectively, to resistor 32. As is apparent, since resistor 32 is of a resistance level of only 1/10th or less, the resistance of resistors $24_a$ through $24_f$, a voltage summing circuit is formed and the voltage which appears as a voltage drop across resistor 32 is proportional to the sum of the individual output voltages which in turn is supplied to the input of amplifier $35_a$. Additionally, as in the embodiment of FIG. 1, a portion of the input voltage $11_a$ is likewise summed with such output voltages by means of a large value resistor $31_a$. Although the summing circuit in the preferred embodiment has only voltages of the same polarity applied, it is within the scope of the invention to use a more generalized summing circuit, not shown, which includes inverting inputs for inverting one or more of the input voltages prior to summing. In this a positive polarity output voltage is made negative and "added" to another positive output voltage which then in effect places the two voltages in a subtractive relationship. Thus a voltage characteristic with a decreasing slope and voltage level is generated. As was heretofore known in the prior art of function generators, any particular voltage characteristic curve can be obtained by approximating that curve with a series sum of individual voltages, whether positive or negative or any combination of same. Thus given a linearly increasing voltage at input $11_a$, an output voltage can be derived at the input of amplifier $35_a$ which is parabolic in characteristic, etc. By suitably varying the individual breakpoint voltages of the individual circuits and the proportion of voltage to be summed any output voltage can be obtained which is functionally related to the input voltage at terminal $11_a$.

It is believed that the foregoing detailed description of my inventions in a nonlinear circuit element and a function generator or linearizer circuit formed by a unique combination of such elements is sufficient in detail to enable one skilled in the art to make and use the invention. However it is understood that my invention is not to be limited in any way to those details since suitable substitutions and equivalents suggest themselves to those skilled in the art upon reading this specification. For example, although I have employed NPN type transistors in the foregoing embodiments, by a modification using known procedures, PNP type transistors can instead be substituted. Where I have incorporated an operational amplifier because it is most reliable, it is equally possible to substitute a less reliable alternative such as the differential amplifier or long tail pair therefor, or by substituting a series forward biased diode between a transistor base and ground which is supplied by a voltage source via a resistor, which resistor is connected at one end to the base, and in which the voltage drop across the diode simulates and to an extent "tracks" the corresponding voltage drop between the base and emitter of the transistor. And where I have used but a single resistor it is equally possible for series connected resistors or combinations of resistors to be employed to form an equivalent resistor. Likewise while I have illustrated for convenience but a single power source connected to the plurality of transistors in the linearizer as the source which remains constant in level, it is obvious to substitute separate individual power supplies which, although more expensive, is still within the spirit and scope of my disclosed invention.

Accordingly it is understood that my invention is to be broadly interpreted and construed within the full spirit and scope of the appended claims.

What I claim is:

1. A circuit for providing an output voltage the magnitude of which bears a nonlinear relationship to the voltage magnitude of a voltage source comprising:

a. a transistor of the type having an emitter adapted to carry an emitter current, $I_e$, a collector adapted to carry a collector current, $I_c$, and a base adapted to carry a base current, $I_b$, and which transistor has a predetermined current transfer characteristic, $\beta$, and in which the respective magnitudes of currents in said transistor bear the relationship to one another of $I_e=I_b+I_c$ at all times, and in which the respective magnitudes of currents in said transistor bear the additional relationship of $I_e=I_c(1+1/\beta)$ and $I_b=I_c/\beta$ when the transistor is in the electrical condition of "out of saturation";

b. a first source of voltage, $V_1$;

c. a second source of voltage, $V_2$;

d. first resistance means, $R_1$, connected between said first source of voltage and said collector to complete a current conducting path therebetween;

e. second resistance means, $R_2$, connected between said second source of voltage and said emitter to complete a current conducting path therebetween;

f. control means having an output connected to said base for providing a current, $I_b$, to said base of approximately $[(V_2/R_2)-I_c]$ amps so that in combination with any collector current, $I_c$, said emitter current, $I_e$, remains at a magnitude essentially equal to (magnitude of $V_2$/resistance of $R_2$) amps (for all $I_b>0$) to thereby maintain a voltage which appears at said emitter at a constant magnitude of approximately zero volts;

g. means for varying the magnitude of only one of said voltage sources $V_1$ or $V_2$;

whereby a voltage output is obtained at said collector having a magnitude that is essentially constant at approximately zero volts over a predetermined range of magnitude of said one of said voltage sources and a magnitude which increases linearly as the magnitude of said one of said voltage sources increases beyond said predetermined range and whereupon beyond said predetermined range said collector current $I_c$ is essentially $I_c=\beta/\beta+1\cdot I_e$.

2. The invention as defined in claim 1 wherein said control means comprises an operational amplifier, said operational amplifier having an input coupled to said emitter for monitoring the emitter voltage and an output coupled to said base.

3. The invention as defined in claim 2 wherein said means for varying the magnitude of only one of said voltage sources $V_1$ or $V_2$ varies said source $V_1$.

4. The invention as defined in claim 2 wherein said means for varying the magnitude of only one of said sources $V_1$ or $V_2$ varies said source $V_2$.

5. The invention as defined in claim 2 wherein said transistor comprises a transistor of the NPN type.

6. The invention as defined in claim 4 wherein said second source of voltage $V_2$ comprises:

a first source of direct voltage of a relatively constant magnitude;

a source of variable voltage;

first and second resistor means;

an output terminal;

means connecting said first resistance means electrically in series with said variable voltage source in between said output terminal and electrical ground potential;

means connecting said direct voltage source and said second resistance means electrically in series between said output terminal and electrical ground potential; whereby the voltage at said output terminal is a net voltage.

7. The invention as defined in claim 1 including a pair of series connected resistance means connected between said collector and electrical ground potential, and means coupled to said pair of resistors for obtaining an output voltage.

8. A circuit for providing an output voltage, the magnitude of which bears a nonlinear relationship to the voltage magnitude of a control voltage source comprising:

transistor means, said transistor means having an emitter electrode, a collector electrode, and a base electrode;

input terminal means for applying an input control voltage thereto;

first resistor means connected between said collector and said input terminal for providing a current conducting path therebetween;

a source of bias voltage;

second resistor means connected to said source of bias voltage and said emitter electrode for providing a current conducting path therebetween;

operational amplifier means, said operational amplifier means having an input connected to said emitter electrode and an output connected to said base electrode for providing an output to said base electrode in response to a voltage at said emitter of approximately zero volts;

an output means connected to said collector electrode.

9. The invention as defined in claim 8 further comprising:

a resistor summing network connected to said output and connected to said input terminal for providing a resultant voltage proportional to the sum of said collector output and said input.

10. A nonlinear circuit element comprising:

transistor means, said transistor means having an emitter, collector and base;

first resistor means;

a first source of bias voltage means connecting said first resistor means between said collector and said first bias voltage source for providing a current conducting path therebetween;

a control voltage input for receiving a control voltage;

second resistor means;

a second source of DC bias voltage;

third and fourth resistor means connected electrically, in series between said input and said second source of bias voltage, and means connecting the midpoint of said third and fourth resistors to one end of said second resistor means and connecting the remaining end of said second resistor means to said emitter;

operational amplifier means having a first input connected to said emitter for monitoring emitter voltage level and a second input connected to a reference voltage and an output connected to said base for providing sufficient output current to said base to maintain said emitter voltage level at said reference voltage level; and output means connected to said collector.

11. The invention as defined in claim 10 further comprising summing circuit means, said summing circuit means having at least two inputs and an output, means coupling one of said summing circuit inputs to said collector and mean coupling a second summing circuit input to said control voltage input for providing an output voltage proportional to the sum of the control voltage and the collector voltage.

12. A linearizer circuit which comprises a plurality of nonlinear circuits, each of said nonlinear circuits including:

a transistor having an emitter, base and collector;

first resistor means having one end connected to said collector;

second resistor means having one end connected to said emitter;

a source of bias voltage connected to the remaining end of said second resistance means;

means connecting the remaining end of each of said plurality of first resistance means electrically in common and an input terminal, said input terminal for receiving an input voltage to be linearized;

operational amplifier means, said operational amplifier means having an input connected to the emitter of one of said plurality of said transistors and an output connected in parallel to each of the base electrodes of said plurality of transistors for providing an output to said bases responsive to a voltage at said one emitter of approximately zero volts;

summing circuit means, said summing circuit means having a plurality of inputs with each of said plurality of inputs connected to a corresponding one of said plurality of collectors and an additional input connected to said input terminal for providing an output voltage proportional to the sum of each of said collector voltages and said input voltage.

13. A circuit for providing an output voltage which varies in magnitude as a nonlinear dependent function of variations in magnitude of a voltage source, comprising:

a transistor, said transistor having an emitter for receiving voltage of a first polarity, a collector for receiving a voltage of a second polarity, and a base for receiving a voltage of a second polarity;

a first source of voltage for providing a voltage of a second polarity;

a second source of voltage for providing a voltage of a first polarity;

one of said first and second sources being changeable in magnitude and the other of said sources being substantially constant;

first resistor means;

means connecting said first resistor electrically in series between said collector and said first voltage source for providing a current conducting path therebetween;

second resistor means;

means connecting said second resistor means electrically in series between said emitter and said second voltage source for completing a current conducting path therebetween;

a reference voltage source;

an operational amplifier for providing an output voltage to said base to maintain the voltage magnitude at said emitter substantially equal to the magnitude of said reference voltage source, said operational amplifier having a first input, a second input, and an output;

means electrically connecting said first input to said emitter;

means electrically connecting said second input to said reference voltage source; and means electrically connecting said output to said base; and circuit means connected to said collector for obtaining an output voltage;

whereby said output voltage is maintained constant over a predetermined range of voltage magnitude of said one of said sources up to a predetermined breakpoint voltage level and thereupon changes in magnitude proportionally to the amount by which said voltage magnitude of said one of said source exceeds said breakpoint voltage level.

14. The invention as defined in claim 13 wherein said reference voltage source comprises electrical ground potential.

15. The invention as defined in claim 13 wherein said changeable one of said first and second sources comprises said first source.

16. The invention as defined in claim 13 wherein said changeable one of said first and second sources comprises said second source.

17. A function generator comprising:

a. a plurality of nonlinear circuits each of which provides an output of essentially zero volts over a range of input voltage up to a respective one of a corresponding plurality of breakpoint voltage levels and thereupon provides an output voltage which varies in magnitude in direct proportion to the amount by which said input voltage exceeds said respective breakpoint voltage level, each of which comprises:

a transistor, said transistor having a current transfer characteristic, $\beta$, an emitter, a collector, and a base;

a first input means for receiving a voltage of a second polarity;

a second input for receiving a voltage of a first polarity;

first resistor means;

means connecting said first resistor electrically in series between said collector and said first input means for providing a current conducting path therebetween;

second resistor means;

means connecting said second resistor means electrically in series between said emitter and said second input means for completing a current conducting path therebetween;

with at least one of said first resistor means, or said second resistor means, or said $\beta$ in any one of said plurality of nonlinear circuits being different in value from the value of a corresponding element in any other one of said plurality of nonlinear circuits;

b. a reference voltage source;

c. operational amplifier means, said operational amplifier having a first amplifier input, a second amplifier input, and an amplifier output;

means electrically connecting said first amplifier input to an emitter of a transistor in one of said plurality of nonlinear circuits, means electrically connecting said second amplifier input to said reference voltage source, and means electrically connecting said amplifier output to the base of each of said transistors in said plurality of nonlinear circuits for providing current to said bases sufficient to maintain the voltage at each corresponding emitter at the level of said reference voltage source;

d. means connecting each of said first input means of said plurality of nonlinear circuits electrically in common;

e. means for connecting said second input means of said plurality of nonlinear circuits electrically in common;

f. a first voltage source for providing a voltage of a second polarity connected to said first input and a second voltage source for providing a voltage of a first polarity connected to said second input, one of said voltage sources being variable in voltage magnitude and the other providing a substantially constant magnitude;

g. summing circuit means, said summing circuit means having a plurality of inputs corresponding to said plurality of nonlinear circuits with a respective input connected in circuit with a corresponding one of the plurality of transistor collectors for providing at an output an output voltage proportional to the sum of all the collector voltages.

18. The invention as defined in claim 17 further comprising:

resistive voltage divider means connected between said one of said voltage sources and source of reference potential for providing an output proportional to said variable voltage;

said summing circuit means having an additional input; and means connecting the output of said voltage divider means to said additional summing circuit means input.

19. The invention as defined in claim 18 wherein said reference voltage source comprises electrical ground potential.

* * * * *